(12) United States Patent
Anderl et al.

(10) Patent No.: US 8,559,984 B2
(45) Date of Patent: Oct. 15, 2013

(54) CALL COMPLETION

(75) Inventors: Ewald Anderl, Middletown, NJ (US);
Raja Moorthy, Fairless Hills, PA (US)

(73) Assignee: Kirusa Inc., New Providence, NJ (US)

( * ) Notice: Subject to any disclaimer, the term of this patent is extended or adjusted under 35 U.S.C. 154(b) by 825 days.

(21) Appl. No.: 12/272,806

(22) Filed: Nov. 18, 2008

(65) Prior Publication Data
US 2009/0143085 A1  Jun. 4, 2009

Related U.S. Application Data

(60) Provisional application No. 61/005,268, filed on Dec. 4, 2007.

(51) Int. Cl.
*H04W 4/00* (2009.01)

(52) U.S. Cl.
USPC .... 455/466; 455/412.2; 455/445; 379/207.08

(58) Field of Classification Search
USPC ........ 455/466, 412.2, 445; 379/207.08, 88.04
See application file for complete search history.

(56) References Cited

U.S. PATENT DOCUMENTS

| | | | |
|---|---|---|---|
| 4,932,042 A | 6/1990 | Baral et al. | |
| 6,507,735 B1 * | 1/2003 | Baker et al. | 455/412.1 |
| 6,639,973 B1 * | 10/2003 | Wheeler et al. | 379/88.18 |
| 6,766,001 B1 | 7/2004 | Hanson | |
| 7,843,835 B2 * | 11/2010 | Yurchenko | 370/241 |
| 7,970,107 B2 * | 6/2011 | Tal et al. | 379/88.04 |
| 2001/0049745 A1 * | 12/2001 | Schoeffler | 709/238 |
| 2002/0160757 A1 * | 10/2002 | Shavit et al. | 455/414 |
| 2003/0063590 A1 * | 4/2003 | Mohan et al. | 370/338 |
| 2003/0169865 A1 | 9/2003 | Oren | |
| 2004/0198327 A1 * | 10/2004 | Bates et al. | 455/414.1 |
| 2004/0203607 A1 | 10/2004 | Satapathy | |
| 2005/0010573 A1 * | 1/2005 | Garg | 707/10 |
| 2006/0104429 A1 | 5/2006 | Wouterse et al. | |

* cited by examiner

*Primary Examiner* — Kamran Afshar
*Assistant Examiner* — Mong-Thuy Tran
(74) *Attorney, Agent, or Firm* — Ash Tankha; Lipton, Weinberger & Husick

(57) ABSTRACT

Disclosed herein is a method and system for completing a call attempt made by a first party on a first network to a second party on a second network. The second network may be the first network or one of multiple networks excluding the first network. The first network detects termination of the call attempt. The first network communicates availability of a messaging service to the first party. The messaging service may be a short messaging service (SMS), a voice SMS, a multimedia messaging service, and a multimodal messaging service. The first network does not bill the first party for the communication of the availability of the messaging service. On acceptance of the messaging service by the first party, the first party creates a message to be delivered to the second party on the second network. The first network delivers the message to the second party on the second network.

21 Claims, 4 Drawing Sheets

CALL COMPLETION

CROSS REFERENCE TO RELATED APPLICATIONS

The following patents are incorporated herein in their entirety:
1. This application claims the benefit of provisional patent application No. U.S. 61/005,268 titled "Call Completion", filed on Dec. 4, 2007 in the United States Patent and Trademark Office.
2. Non-provisional patent application number U.S. Ser. No. 10/589,325 titled "Methods for Identifying Messages and Communicating with Users of a Multimodal Message Service", filed on Aug. 14, 2006 in the United States Patent and Trademark Office.
3. Patent application U.S. Pat. No. 7,184,786 titled "Techniques for combining voice with wireless text short message services" assigned to Kirusa, Inc. NJ, USA.

BACKGROUND

This invention, in general, relates to messaging services. More particularly, this invention relates to completing a call attempt made by a first party on a first network to a second party on a second network.

When a caller attempts to call a recipient on a network, multiple conditions may cause the call attempt to be terminated. For example, the call may be terminated due to a busy signal, an unanswered signal, an unreachable signal, manual termination by the caller, etc. The caller may thereafter wish to send a message to the recipient to complete the call attempt. There is a need for a messaging service to enable the caller to create and deliver messages including short messaging service (SMS) messages, voice SMS messages, multimedia messaging service (MMS) messages, and multimodal messages without making another call, or re-initiating the call to the recipient. Moreover, there is a need for a messaging service that enables the recipient to retrieve the message sent by the caller without difficulty.

The caller may manually terminate the call attempt on encountering the busy signal, the unanswered signal, the unreachable signal, etc. Even if a network provides some call attempt completion services, communicating availability of the call attempt completion services to the caller before the manual termination may not be possible. There is a need for communicating availability of call attempt completion services before and after manual termination of the call attempt by the caller.

Hence, there is an unmet need for completing a call attempt made by a first party on a first network to a second party on a second network by providing a messaging service, where availability of the messaging service for sending a message to the second party is communicated to the first party before or after manual termination of the call attempt by the first party.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the need for completing a call attempt made by a first party on a first network to a second party on a second network by providing a messaging service, where availability of messaging service for sending a message to the second party is communicated to the first party before or after manual termination of the call attempt. The second network may be the same as the first network, or one of any other networks excluding the first network. The first network detects termination of the call attempt made by the first party on the first network to contact the second party on the second network. The call attempt may, for example, be terminated due to occurrence of a busy signal, an out of coverage signal, an unreachable signal, congestion of one or more of the first network and the second network, an unanswered signal from the second party, or manual call termination by the first party.

The first network communicates availability of a messaging service to the first party on detection of termination of the call attempt. The messaging service may, for example, be a short messaging service (SMS), a voice SMS service, a multimedia messaging service, and a multimodal messaging service. The first network may communicate the availability of the messaging service to the first party via, for example, a voice call, an SMS message, or an alert based on unstructured supplementary service data. The first network may communicate the availability of the messaging service to the first party prior to manual call termination by the first party or after the manual call termination by the first party. The first network may communicate the availability of the messaging service to the first party after manual call termination by the first party via a voice call. The first party is not billed for the communication of the availability of the messaging service.

Acceptance and declination of the messaging service by the first party may, for example, be detected by an explicit dual tone multi frequency input, an implicit predefined timeout, or a subscription of the first party to the messaging service. On acceptance of the messaging service by the first party, the first party creates a message to be delivered to the second party on the second network. Creating the message by the first party may, for example, comprise recording one or more of a text SMS message, a voice SMS message, a multimedia messaging service message, and a multimodal message on a communication device of the first party.

The first network delivers the created message to the second party on the second network. The text SMS message, the voice SMS message, the multimedia service message, and the multimodal message are delivered to the second party in a text short messaging service message format, a voice SMS message format, a multimedia messaging service message format, and a multimodal message format respectively. The first party is billed for the delivery of the created message. On declination of the messaging service by the first party, the first network sends a missed call notification to the second party. The first network may send a missed call notification to the second party on declination of the messaging service by the first party.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
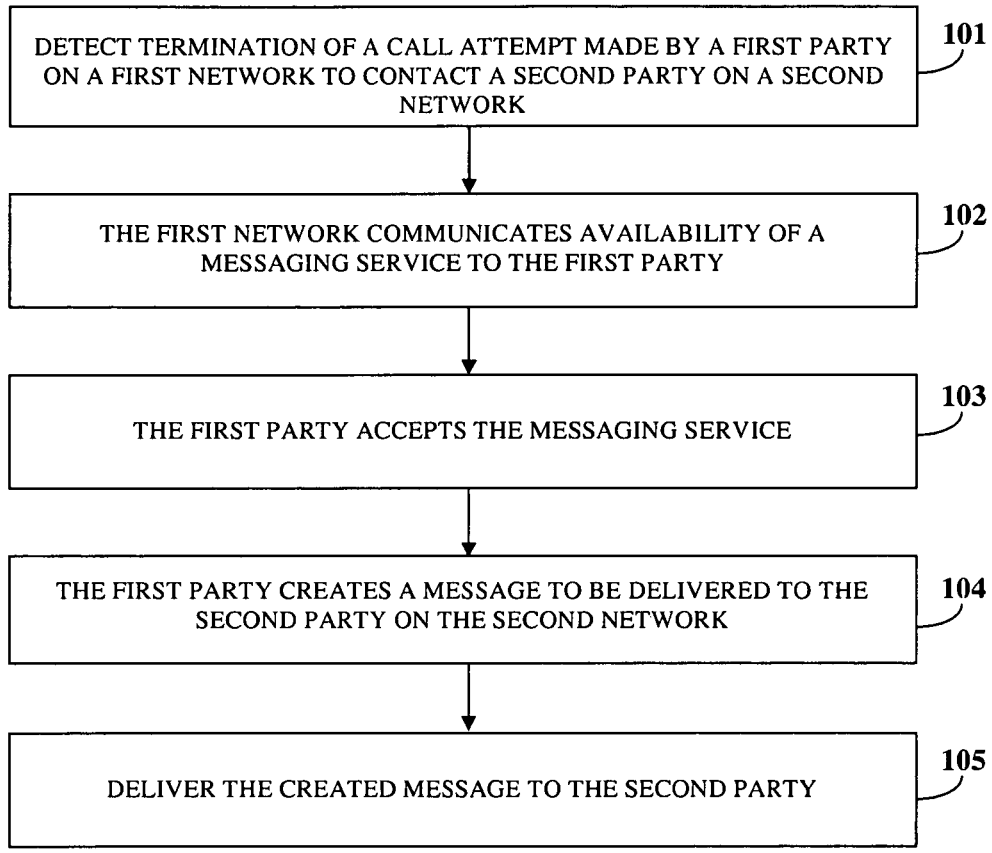
FIG. 1 illustrates a method of completing a call attempt made by a first party on a first network to a second party on a second network.
Figure 2:
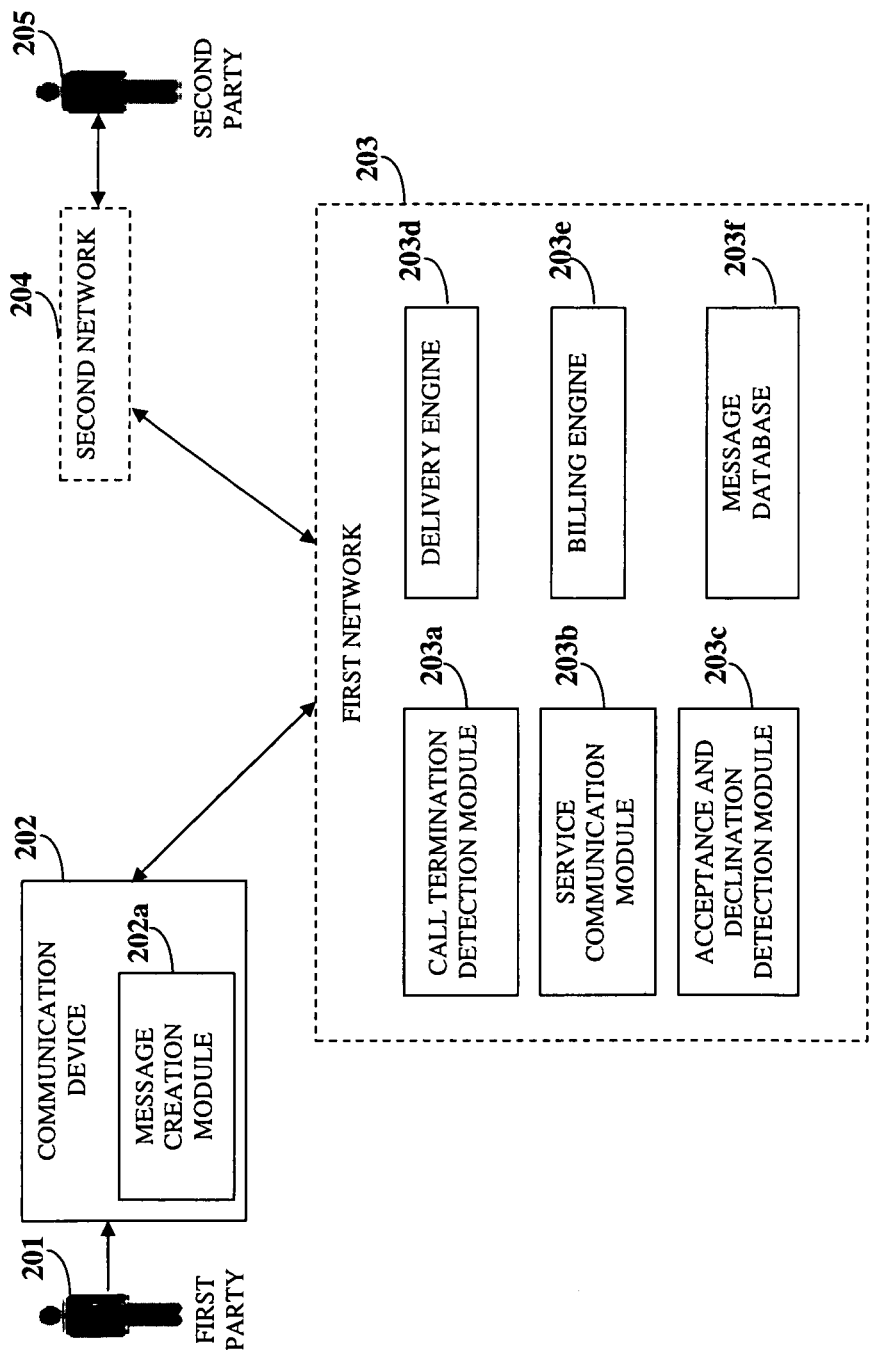
FIG. 2 illustrates a system for completing a call attempt made by a first party on a first network to a second party on a second network.

FIG. 1 illustrates a method of completing a call attempt made by a first party 201 on a first network 203 to a second party 205 on a second network 204. The first party 201, the first network 203, the second party 205, and the second network 204 are illustrated in FIG. 2. The second network 204 may be the first network 203, or one of multiple networks excluding the first network 203. The call may be initiated on a wireless telephony network or a wired telephony network. The first network 203 detects 101 termination of the call attempt. The call attempt may, for example, be terminated due to occurrence of a busy signal, an out of coverage signal, an unreachable signal, congestion of one or more of the first network 203 and the second network 204, an unanswered signal from the second party 205, and manual call termination by the first party 201.

On detection of the termination of the call attempt, the first network 203 communicates 102 availability of a messaging service to the first party 201. The messaging service may, for example, be a short messaging service (SMS), a voice SMS service, a multimedia messaging service, and a multimodal messaging service. As used herein, the term "multimodal messaging" refers to a mode of communication that seamlessly combines graphics, text, and audio output with speech, text, and touch input to provide an enhanced user interface.

The multimodal messaging service combines voice data and other modalities, for example, image, video, etc. with a text SMS message. The multimodal messaging service enables use of multiple modalities of communication based on requirements of the first party 201 and the usage environment. As used herein, modalities refer to any human mode of interaction on the input side of an application, for example, the first party's 201 voice, any visual mode, or combination of voice and any visual mode, etc., that allows the first party 201 to speak, hear, type, touch or see in that application, and one or more human interaction modes on the output side of the application such as the second party's 205 ability to hear, visually see, or simultaneously hear and visually see the output. Multimodal interactions thereby extend web or other application user interface to allow multiple modes of interaction, offering the first party 201, for example, the choice of using their voice, or an input device such as a key pad, keyboard, mouse or stylus. For output, the second party 205 will, for example, be able to listen to spoken prompts and audio, to view information on graphical displays, and to simultaneously listen to and view an output.

Multimodal messaging enables users to send and receive voice messages associated directly with text SMS messages. To send a multimodal message, the first party 201 composes a message to be sent using SMS technology using a text input device, for example, a keypad of a mobile phone. The composed text message is associated and combined with a voice message recorded by the first party 201. The combined message is sent to the second party 205 via a multimodal messaging platform. The multimodal messaging platform synchronizes and processes input voice and text information and transfers the synchronized and processed information to a mobile phone of the second party 205. The multimodal platform enables wireless carriers and service providers to offer applications with integrated voice and visual interfaces.

The second party 205 may then read the received text message and retrieve the associated voice message via a link provided in the received text message or in a separate text message by the multimodal platform. A speech recognition engine may be used for control of the playback and recording of voice messages as well as control of other messaging functions. Multimodal messaging may be implemented using wireless telephone devices capable of sending and receiving SMS text messages and may also be extended to different device types and network technologies.

The first network 203 may communicate the availability of the messaging service to the first party 201 by, for example, a voice call, an SMS message, or an alert based on unstructured supplementary service data (USSD). The first network 203 may communicate the availability of the messaging service to the first party 201 prior to manual call termination by the first party 201 or after the manual call termination by the first party 201. For example, if the first party 201 attempts to call the second party 205 and encounters a busy signal, the availability of the messaging service may be communicated to the first party 201 before the first party 201 manually terminates the call by pressing an "END" key on the first party's 201 communication device 202. However, if the first party 201 manually terminates the call by pressing the "END" key before the communication of the availability of the messaging service, the first network 203 may communicate the availability of the messaging service after the manual call termination by placing a voice call to the first party 201. The first party 201 is not billed for the communication of the availability of the messaging service.

The first party 201 accepts 103 the messaging service. The first network 203 detects the acceptance or declination of the messaging service by the first party 201 by an explicit dual tone multi frequency (DTMF) input, for example, by the first party 201 pressing a "#" key on the communication device 202, an implicit predefined timeout, for example, by the first party 201 waiting on the line for a predefined period of time, or a subscription of the first party 201 to the messaging service. If the first party 201 declines the messaging service, the first network 203 sends a missed call notification to the second party 205. When the first party 201 accepts the messaging service, the first party 201 creates 104 a message to be sent to the second party 205 on the second network 204. The first party 201 may create the message, for example, by typing a text SMS message, recording a voice SMS message, and by composing an MMS message or a multimodal message on the first party's 201 communication device 202. The first network 203 then delivers 105 the created message to the second party 205 on the second network 204. The call attempt made by the first party 201 on the first network 203 to the second party 205 on the second network 204 is thereby completed.

The first network 203 delivers the created message by transmitting the created message to the second party 205 in a suitable format. The created text SMS message is delivered in a text SMS format. The recorded voice SMS message is delivered in a voice SMS message format. The recorded MMS message is delivered in an MMS message format. The recorded multimodal message is delivered in a multimodal message format. The first network 203 may bill the first party 201 for the delivery of the created message.

Figure 3:
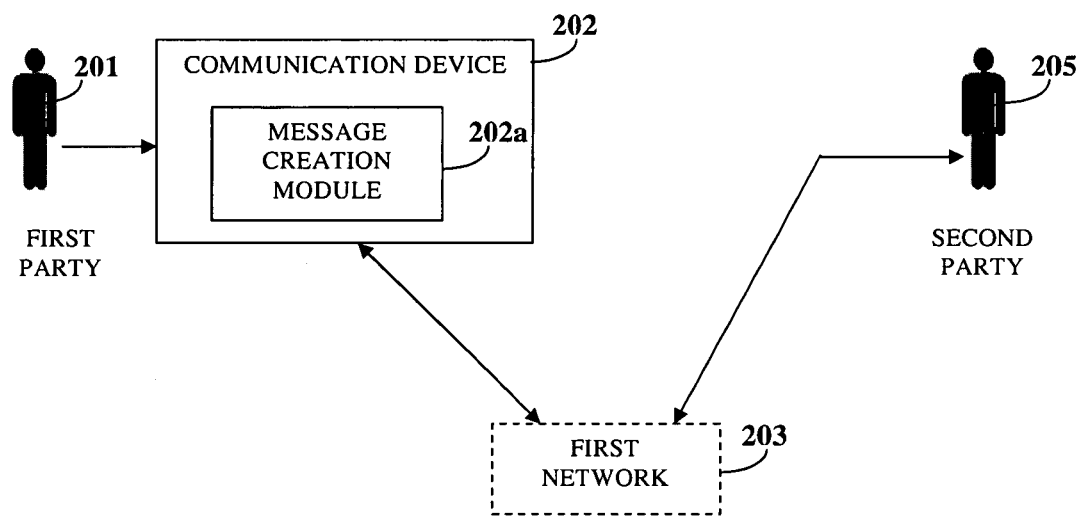
FIG. 3 exemplarily illustrates a system for completing a call attempt made by the first party to the second party within the first network.

FIG. 2 illustrates a system for completing a call attempt made by a first party 201 on a first network 203 to a second party 205 on a second network 204. The second network 204 may be the first network 203, or one of multiple networks excluding the first network 203. A system for completing a call attempt made by the first party 201 to the second party 205 within the first network 203 is exemplarily illustrated in FIG. 3. The system disclosed herein comprises a call termination detection module 203a, a service communication module 203b, an acceptance and declination detection module 203c, a delivery engine 203d, a billing engine 203e, a message database 203f, and a message creation module 202a. The call termination detection module 203a, the service communication module 203b, the acceptance and declination detection module 203c, the delivery engine 203d, the billing engine 203e, and the message database 203f may be part of the first network 203. The message creation module 202a may be provided on a communication device 202 of the first party 201.

The call termination detection module 203a detects termination of a call attempt made by the first party 201 to contact the second party 205. The call termination detection module 203a may, for example, detect the termination of the call attempt due to occurrence of a busy signal, an out of coverage signal, an unreachable signal, congestion of one or more of the first network 203 and the second network 204, an unanswered signal from the second party 205, and a manual call termination by the first party 201. On detection of the termination of the call attempt, the service communication module 203b communicates availability of a messaging service to the first party 201. The service communication module 203b may, for example, communicate availability of the messaging service by a voice call, a short message service message, or an alert based on unstructured supplementary service data. The messaging service may, for example, be one or more of a short messaging service (SMS), a voice short messaging service, a multimedia messaging service (MMS), and a multimodal messaging service. The service communication module 203b may communicate the availability of the messaging service prior to manual call termination by the first party 201 or after the manual call termination by the first party 201.

The first party 201 may accept or decline use of the messaging service. The acceptance and declination detection module 203c may, for example, detect the acceptance or the declination of the messaging service by the first party 201 by an explicit dual tone multi frequency (DTMF) input, an implicit predefined timeout, or a subscription of the first party 201 to the messaging service. On acceptance of the messaging service, the first party 201 may create a message to be sent to the second party 205 on the second network 204 using the message creation module 202a. The message creation module 202a may, for example, enable the first party 201 to create a text SMS message, and record a voice SMS message, an MMS message, or a multimodal message on the communication device 202.

The message database 203f may store the created message. The delivery engine 203d then delivers the created message to the second party 205 on the second network 204. The delivery engine 203d delivers the created message by transmitting the created message to the second party 205 in a suitable format. The delivery engine 203d delivers the text SMS message in a text SMS format, the recorded voice SMS message in a voice SMS message format, the composed MMS message in an MMS message format, and the composed multimodal message in a multimodal message format. The delivery engine 203d may also deliver a missed call notification to the second party 205 if the first party 201 declines use of the messaging service.

The billing engine 203e bills the first party 201 for the delivery of the created message. The billing engine 203e determines the bill amount to be paid by the first party 201 for the delivery of the created message. The billing engine 203e does not bill the first party 201 for the communication of the availability of the messaging service. The message database 203f stores communication information of the messaging service, missed call notifications sent to the second party 205, and billing information of the first party 201.

Figure 4:
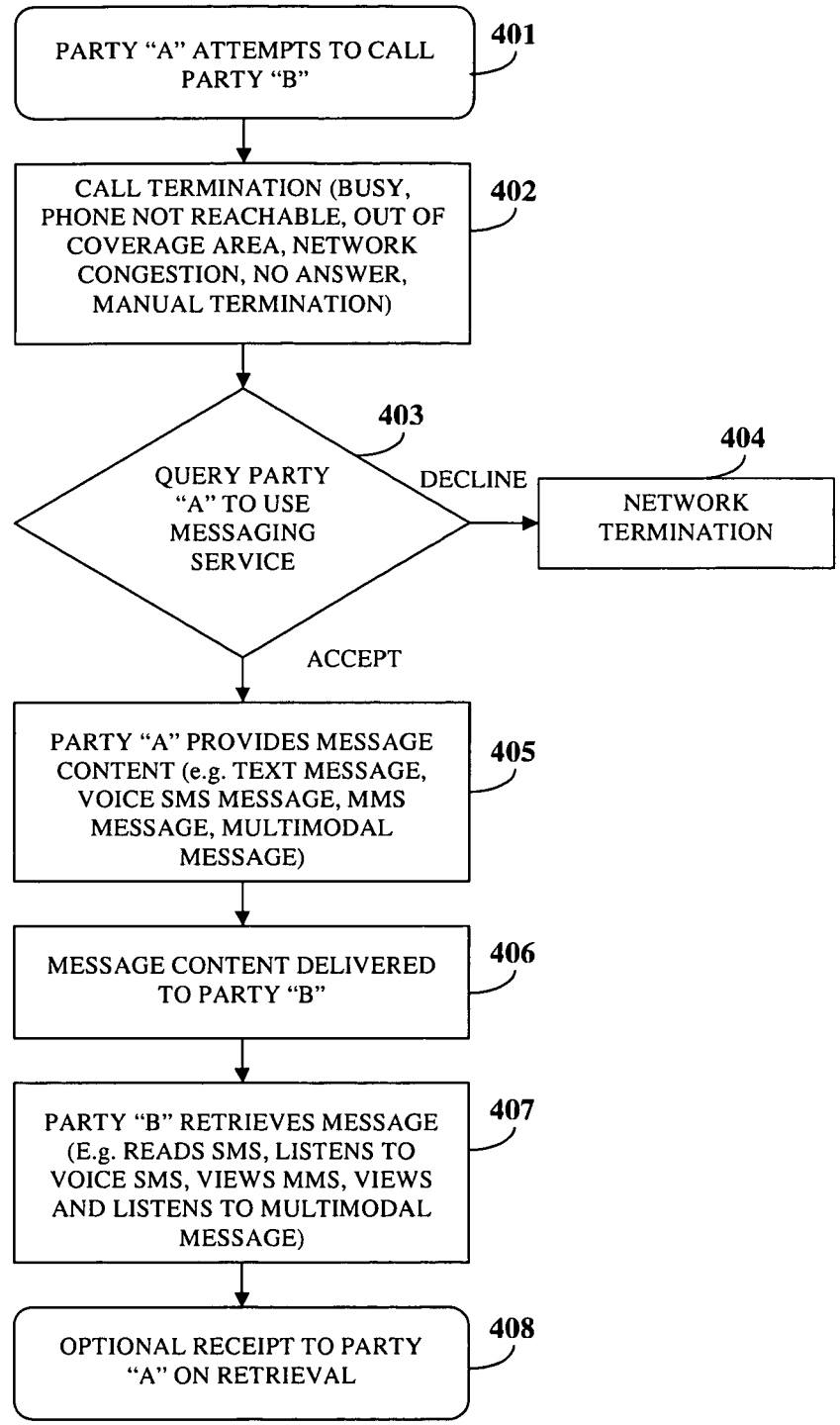
FIG. 4 exemplarily illustrates a flowchart of the steps for completing a call attempt made by the first party to the second party within the first network.

FIG. 4 exemplarily illustrates a flowchart of the steps for completing a call attempt made by a first party 201 to a second party 205 within a first network 203. Consider party "A" who attempts 401 to call party "B". Due to conditions such as occurrence of a busy signal, an out of coverage signal, an unreachable signal, congestion of the first network 203, an unanswered signal from the party "B", or manual termination by the party "A", the call attempt may be terminated. The first network 203 detects the termination 402 of the call attempt. The first network 203 then queries 403 party "A" to use the messaging service. If party "A" declines the use of the messaging service, the first network 203 terminates 404 the call. If party "A" accepts the messaging service, party "A" provides 405 message content by typing a text SMS message, recording a voice SMS message, an MMS message, or a multimodal message on party "A'"s communication device 202. The first network 203 then delivers 406 the message content created by party "A" to party "B". Party "B" then retrieves 407 the message content from the first network 203. Party "B" may, for example, read the SMS, listen to the voice SMS, view the MMS, or view and listen to the multimodal message. On retrieval of the created message, party "A" may be notified of the receipt 408 by the party "B".

Consider an example of a first party 201 John attempting to call a second party 205 Jane using a mobile phone as a communication device 202. John is a subscriber of a first network 203 Network1 and Jane is a subscriber of a second network 204 Network2. Alternatively, both John and Jane may be subscribers of Network1. When John attempts to call Jane, Jane may be out of reach of Network2 and the call may be terminated. Network1 detects the termination of the call attempt by John and informs John about the availability of the messaging service. Network1 may inform John about the availability of the messaging service before he manually terminates the call by pressing the "END" key on his mobile phone. If John manually terminates the call before Network1 informs him about the availability of the messaging service, Network1 may send John an SMS message or may contact John via a voice call to inform him about the availability of the messaging service. John is not billed for the information about the availability of the messaging service.

Network1 may provide John the option to send a message to Jane by pressing the "#" key on his mobile phone. If John does not want to send a message to Jane, Network1 will send a missed call notification to Jane. Jane receives the missed call notification when she comes back into the reach of Network2. If John decides to send a message to Jane, he creates the message on his mobile phone. Network1 delivers the created message to Jane and bills John for the delivery of the message.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, .NET or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the message database 203f, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be implemented using standard wireless telephone devices capable of sending and receiving text SMS messages, voice SMS messages, MMS messages, multimodal messages and may be extended to other device types, and network technologies. Further, the present invention is not limited to wireless phones but will also work with wired line phones with SMS and MMS capabilities and services over such wired line devices.

The present invention may be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method of completing a call attempt made by a first party to a second party, comprising:
  detecting failure of completion of said call attempt made by said first party on a first network to contact said second party on a second network, wherein said second network is one of said first network and one of a plurality of networks excluding the first network;
  enabling the first party to contact the second party by completing the call attempt, comprising the steps of:
    communicating availability of a messaging service to the first party from either the first network or the second network;
    inputting an explicit or implicit action by the first party indicating one of an acceptance of said messaging service and a declination of said messaging service by the first party;
    detecting one of said acceptance of said messaging service and said declination of said messaging service based on one of an explicit dual tone multi frequency input by the first party and an implicit predefined timeout period;
    on said acceptance of said messaging service, creating a message by the first party to be delivered to the second party on the second network;
    delivering one of said created message and a missed call notification to the second party on the second network or taking no action based on one of said acceptance of said messaging service and said declination of said messaging service;
  whereby the call attempt made by the first party to the second party is completed.

2. The method of claim 1, wherein the messaging service is one or more of a short messaging service, a voice short messaging service, a multimedia messaging service, and a multimodal messaging service.

3. The method of claim 1, wherein the call attempt is terminated due to occurrence of one of a busy signal, an out of coverage signal, an unreachable signal, congestion of one or more of the first network and the second network, an unanswered signal from the second party, and manual call termination by the first party.

4. The method of claim 1, wherein said availability of the messaging service is communicated by one of a voice call, a short message service message, and an alert based on unstructured supplementary service data.

5. The method of claim 1, further comprising a step of sending a missed call notification to the second party on declination of the messaging service by the first party.

6. The method of claim 1, wherein to the first party is not billed for said communication of said availability of the messaging service.

7. The method of claim 1, further comprising a step of billing the first party for said delivery of the created message.

8. The method of claim 1, wherein said availability of the messaging service is communicated to the first party prior to manual call termination by the first party.

9. The method of claim 1, wherein said availability of the messaging service is communicated to the first party after manual call termination by the first party via a voice call.

10. The method of claim 1, wherein said step of creating the message by the first party comprises recording one or more of a text short messaging service message, a voice short messaging service message, a multimedia messaging service message, and a multimodal message on a communication device of the first party.

11. The method of claim 10, wherein said text short message service message, said voice short messaging service message, said multimedia service message, and said multimodal message are delivered to the second party in a text short messaging service message format, a voice short messaging service message format, a multimedia messaging service message format, and a multimodal message format respectively.

12. A system for completing a call attempt made by a first party to a second party, comprising:
- a call termination detection module for detecting failure of completion of said call attempt made by said first party on a first network to contact said second party on a second network, wherein said second network is one of said first network and one of a plurality of networks excluding the first network;
- a service communication module for communicating availability of a messaging service to the first party from either the first network or the second network;
- an acceptance and declination detection module for detecting one of an acceptance of the said messaging service and a declination of the messaging service by the first party based on one of an explicit dual tone multi frequency input by the first party and an implicit predefined timeout period;
- a message creation module for enabling the first party to create a message to be delivered to the second party on the second network on acceptance of said messaging service; and
- a delivery engine for performing one of:
  - delivering said created message to the second party on the second network on said acceptance of said messaging service; and
  - delivering a missed call notification to the second party on the second network or taking no action on said declination of said messaging service.

13. The system of claim 12, wherein said call termination detection module detects termination of the call attempt due to occurrence of one of a busy signal, an out of coverage signal, an unreachable signal, congestion of one or more of the first network and the second network, an unanswered signal from the second party, and manual call termination by the first party.

14. The system of claim 12, wherein said message creation module enables the first party to create one or more of a text short messaging service message, a voice short messaging service message, a multimedia messaging service message, and a multimodal message on a communication device of the first party.

15. The system of claim 12, wherein said service communication module communicates said availability of the messaging service by one of a voice call, a short message service message, and an alert based on unstructured supplementary service data.

16. The system of claim 12, wherein said service communication module communicates said availability of the messaging service prior to manual call termination by the first party.

17. The system of claim 12, wherein said service communication module communicates said availability of the messaging service after manual call termination by the first party.

18. The system of claim 12, further comprising a billing engine for billing the first party for said delivery of the created message.

19. The system of claim 18, wherein said billing engine does not bill the first party for the communication of the availability of the messaging service.

20. The system of claim 12, further comprising a message database for storing messages created by the first party, communication information of the messaging service, missed call notifications sent to the second party, and information on billing the first party for said delivery of the created message.

21. A computer program product comprising computer executable instructions embodied in a non-transitory computer readable medium, wherein said computer program product comprises:
- a first computer parsable program code for detecting failure of completion of a call attempt made by a first party on a first network to contact a second party on a second network;
- a second computer parsable program code for communicating availability of a messaging service to said first party;
- a third computer parsable program code for inputting an explicit or implicit action indicating one of an acceptance of said messaging service and a declination of said messaging service by the first party;
- a fourth computer parsable program code for detecting one of said acceptance of said messaging service and said declination of said messaging service based on one of an explicit dual tone multi frequency input by the first party and an implicit predefined timeout period;
- a fifth computer parsable program code for enabling the first party to create a message to be delivered to the second party on said second network on said acceptance of said messaging service; and
- a sixth computer parsable program code for delivering one of said created message and a missed call notification to the second party or taking no action based on one of said acceptance of said messaging service and said declination of said messaging service.

\* \* \* \* \*